Nov. 25, 1969　　　P. J. BROWNSCOMBE　　　3,480,358
FILM STRIP REELING APPARATUS

Filed Feb. 1, 1966　　　　　　　　　　　　　5 Sheets-Sheet 3

INVENTOR:
PHILIP J. BROWNSCOMBE
BY
Marzall, Johnston, Cook & Root
ATT'YS

INVENTOR:
PHILIP J. BROWNSCOMBE
BY
Marzall, Johnston,
Cook&Root
ATT'YS

Nov. 25, 1969   P. J. BROWNSCOMBE   3,480,358
FILM STRIP REELING APPARATUS

Filed Feb. 1, 1966   5 Sheets-Sheet 5

INVENTOR:
PHILIP J. BROWNSCOMBE
BY
Marzall, Johnston, Cook & Root
ATT'YS

United States Patent Office 3,480,358
Patented Nov. 25, 1969

3,480,358
FILM STRIP REELING APPARATUS
Philip J. Brownscombe, Millington, N.J., assignor to Eugene Dietzgen Co., Chicago, Ill., a corporation of Delaware
Filed Feb. 1, 1966, Ser. No. 524,123
Int. Cl. G03b 23/12
U.S. Cl. 353—26          17 Claims

ABSTRACT OF THE DISCLOSURE

Film reeling apparatus for feeding in either direction a film strip across a light-projection head. The advancement of the film in either direction is achieved through a mechanism embodying a slip clutch drive for the spindles, the drive being applied to the spool upon which the film is being wound, and a flexible band brake operating on the spindle for each spool in a manner whereby the brakes are substantially released for rapid advancement to the film in either direction or are slowly released whereby the friction of the slip clutch drive barely overcomes the frictional resistance of the band brake so that the film advances slowly.

---

The apparatus of the present invention is particularly suited for use in portable film readers, e.g., compact, motorized film readers designed for viewing selected frames on the film. The film strip may be wound on reels or on film magazines, as desired.

The film advancing mechanism of the invention features motor-driven film advance and rewind. The direction and speed of film travel are controlled by a single lever. Advance and rewind film speeds can be varied from a very slow motion up to transporting the film at a rapid rate, i.e., to move the film rapidly to the section upon which the desired frame or frames is located, after which the film is advanced or rewound slowly until the proper frame is in the light projection head.

The film strip advancing and rewinding apparatus to which the invention pertains comprises a first, rotatable spindle for holding a first film spool or magazine, and a second rotatable spindle for a second film spool. The first spindle has thereon a first brake drum which is coupled therewith. The second spindle has a corresponding, second brake drum coupled therewith. Each brake drum has wound spirally thereabout a flexible brake band. The spirals are in directions of opposite hand around the respective brake drums. One end of each flexible band is rigidly attached to the frame structure of the apparatus. The other ends of the respective bands are coupled to a movable mechanism through a yieldable spring, e.g., a coil spring, whereby the coil spring imparts a slight tension to the respective flexible band when the band is in braking engagement on the respective brake drum. The coil spring, as aforesaid, is attached to the other end of each flexible band and also to the movable mechanism, which is movable by a linkage connected through a single, manually operated lever, in a manner whereby the braking action of the flexible bands on the respective brake drums can be released slightly or completely, depending upon the extent of movement of the manually movable lever.

Each spindle and its respective brake drum are coupled together and are also coupled with an engagement element of the clutch for each spindle drive. The engageable element preferably comprises a member having radially extending arms with friction-including pads, e.g., cork pads, on the outer ends of the arms. In idle, non-drive position, the cork pads are slightly spaced from or in very light brushing contact with the respective clutch plate.

One of the features of the invention is the relationship of the flexible bands or the braking elements on each spindle which provides a stronger braking action on the spindle from which the film is being drawn than on the spindle onto which the film is being wound. The stronger braking action on the first mentioned spindle prevents film spillage through overrun by the feed spool as the braking action commences. The relationship aforedescribed is provided through the use of the spiral winding of the flexible bands around the brake drums in a manner whereby the tension or pull on the flexible band is on the end which is rigidly attached. The brake band has a stronger braking action when the tension or pull is on the rigidly attached end than is the case when the tension or pull is on the coil spring-attached end because the coil spring has resiliency and will release to some extent the braking effect of the flexible band on the brake drum.

The mechanism for bringing the respective clutch elements into engagement with the clutch plate and simultaneously releasing the braking effect of the band brakes on the respective brake drums is accomplished through a series of link arms and pivotable members which move in response to movement of the manual control lever. For example, when the manual control member is moved toward advance position, film is drawn off the feed spool or magazine by the engagement of the clutch of the drawing spool on the other spindle. Simultaneously, both brakes are released by reducing or completely relieving, depending upon the degree of movement of the manual lever, of the coil spring end of the flexible brake bands. When the manual lever is moved to full advanced position, both brake drums are completely released so that the film advances rapidly. On the other hand, when the manual lever is moved slowly toward advance position, the tension in the flexible brake bands is reduced slowly, and the coil springs still having a resilient, tension effect on its end of the respective brake bands. When the lever is moved sufficiently so that these ends of the brake bands are loose enough so that the frictional engagement of the clutch elements imparts sufficient torque to the winding spindle to overcome the tension effect of the brake on both spindles, the film will advance very slowly, e.g., at a speed so that each frame can be scanned quickly to ascertain whether it is the frame which the user of the machine desires to read. When the lever is returned to its center, inoperative position, the film stops with the frame desired in the projection head of the film advancing and rewind mechanism.

Preferably a microswitch is used for the circuit of electric drive motor which drives a belt employed in association with a pulley on the motor and pulleys connected with the respective clutch plates. The microswitch has a contact element which is actuated by the movement of the manual lever in a manner whereby the microswitch is open when the manual lever is in center, home position. This deenergizes the motor circuit so that there is no drive at all of the pulleys and belt driven thereby. When the manual lever is moved to either side of home position, the microswitch closes so that the motor circuit is energized, and the drive is applied to the respective pulleys to which the clutch plates are attached.

It is a primary object of the invention to provide new combinations in flexible strip, e.g., photographic film strip, advancing and rewinding apparatus embodying the combination of advance and rewind spindles each having friction clutches and brakes coacting with actuating mechanism to provide slow or fast advance or rewind of the flexible strip, as desired.

Another object of the invention is to provide combinations as aforesaid in which the advance or rewind is actuated through the movement of a single, pivotable, hand operated lever.

Another object of the invention is to provide combinations as aforesaid in which the brakes are flexible bands coacting with brake drums, about which said bands are spirally wound.

A still further object is to provide combinations with the aforesaid brake bands in which one end of the brake bands is rigidly mounted in the structure of the apparatus while the other end is mounted on said structure through a resilient, axially elongatable member such as a coil spring.

Still another object of the invention is to provide new and improved clutch mechanisms for activating the rotation of spindles for the advancing and rewinding of film strips and like flexible strips.

Still another object of the invention is to provide clutch elements as aforesaid embodying a clutch plate driven by a belt-or-band-driven pulley and friction-engaging elements comprising a member with radial arms and friction contact members on the ends of said arms.

Still another object of the invention is to provide linkage movements and structures in the combinations aforesaid for achieving the purposes aforesaid.

These, as well as other objects, purposes and advantages of the invention, will be made apparent to those skilled in the art through the following detailed description of a preferred embodiment of the invention. This preferred embodiment is illustrated in the drawings, wherein:

Referring to the drawings, the apparatus will be disclosed in a series of sections devoted to particular components according to their purpose and function. The first of these components is the section devoted to the frame and general components thereof.

FRAME AND GENERAL COMPONENTS

The apparatus comprises a housing 20 including a top plate 25. A lamp and lens housing 21 is mounted on the top plate. Immediately ahead of the lamp housing there is provided a film guide section 22. A feed section 23 for a film spool or magazine is located to one side of the lamp housing 21 and film guide section 22. It includes a spindle 24, the details of which are hereinafter described.

On the other side of the lamp housing 21 and film guide section 22 there is provided a film take-up section 26 having a spindle 27, the details of which are also hereinafter described.

The top plate has in its lower left-hand corner a manual, selector switch 28 for selecting the type of current to be supplied to the machine. The electric circuits include a line circuit adapted to be connected through a male plug to ordinary 110–120 volt alternating current, an internal battery circuit connected with a rechargeable battery provided in the machine, and a 12 volt direct current circuit connectable with a 12 volt battery through a suitable connection, e.g., one which can be coupled into an automotive circuit via a plug capable of being plugged into an automobile cigarette lighter.

The machine also has an on-off switch 29 for energizing and deenergizing the electrical circuit of the machine. In the lower right-hand corner of the top plate 25 there is provided a knob 31, which is a knob for manipulating the forward-rewind mechanism hereinafter described.

LAMP-LENS SECTION

The lamp and lens section has a metal, perforated cover 32 removably mounted thereon through the use of clip 33, the latter being attached by screws on the top plate 25. The lamp and lenses are covered by a vented, three-sided covering 34.

Figure 3:
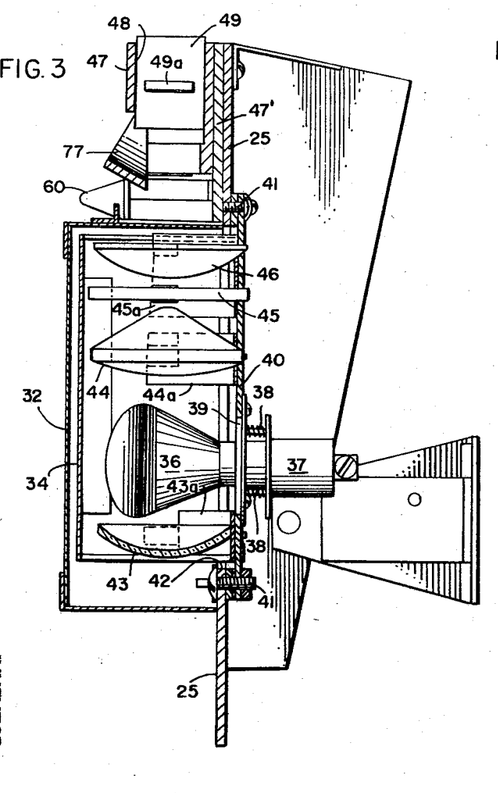
FIG. 3 is a section on section plane 3—3 of FIG. 1 through the lamp and lens section of the apparatus.

Referring particularly to FIG. 3, the lamp-lens section comprises an incandescent bulb 36 mounted in a socket 37. The latter is mounted by screws 38 to a mounting plate 39, the latter extending across an opening in the base plate 40. The base plate 40, in turn, is secured by screws 41 and extends across an opening 42 in the base plate 25.

A light projection unit of the lamp-lens system comprises a concave mirror 43 located behind the lamp 36. The light reflected therefrom is directed through lenses 44 and 46, and transparent heat filter 45, which are coaxially positioned ahead of the lamp 36. Mirror 43, lens 44, heat filter 45 and lens 46 are mounted, respectively, on plate 40 by slotted U-clips 43a, 44a and 45a.

FILM GUIDE AND FOCUSING LENS

This section of the apparatus of the invention lies directly ahead of the lamp-lens section. It comprises a base plate 47' attached to the plate 25. Plate 47' carries a block 47 having in its forward portion an axial cylindrical opening 48. A cylindrical focusing lens barrel 49 is slidably held in the cylindrical opening 48. It is movable forwardly and backwardly for focusing through a focusing activating mechanism shown in FIG. 1. The focusing mechanism comprises a rotatable rod 50 pivotable by the manually operated pivot arm 51. The rod 50 is connected therewith through a hub 52 of arm 51 and is rotatably journalled on a side bracket 53 and also in the side of block 47. This head end 54 of the shaft 50 has an eccentric pin (not shown) which is slidably received in a vertical, circumferential groove 49a in the side of the lens barrel 49, whereby pivotal movement of the shaft 50 moves the lens barrel axially as the eccentric pin is orbited.

The film guide section comprises a pair of cylindrical posts 55, 56 secured by screws 57 to the plate 47'. These vertical posts 55, 56 support a bar 58 extending thereacross and projecting laterally beyond the posts 55, 56. The bar 58 is secured to the upper ends of the posts by screws 59.

The laterally projecting ends of the bar 58 have openings in which are mounted the bases of upstanding, conical projections 60 and 61. These conical projections are fixed relative to the bar 58 and assist in laying the film strip in the guide section, as hereinafter described.

Bushings 62 and 63, fixedly mounted, respectively, in the cones 60 or 61 and in the base plate 47', rotatably support pins 64 and 65 of rollers 66 and 67. These rollers 66 and 67 are guide rollers across which the film strip moves as it is transported through the film guide section.

The upper, rear edge 68 of the block 47 is cut away in a manner whereby the cut away portion intercepts the cylindrical passage 48 at the rear portion thereof. The sides of the block at the intercepted passage 48 have mounted thereon a thin, flat, U-shaped metal plate 69 rigidly supported on the top of the cut away portion 68. This metal plate 69 has a rivet 70 which is used to rigidly attach thereto a guide block 71. The guide block 71 has a lower, beveled edge 72 immediately ahead of a downwardly opening film guide slot 73. The lower plate 47' has mounted thereon a film guide block 74 having an upper, beveled edge 75 immediately ahead of the upwardly opening film guide slot 76.

The film is placed in the film guide device by pushing it downwardly behind the cones 60 and 61 and ahead of a U-shaped guide member 77. The guide member 77 has a sloping, curved face 78 which, in coaction with the cones 60 and 61, guides the film strip into the area of the guide blocks 71 and 74. After the film strip has dropped below the lower edge of the guide member 77, tension in the film draws it into the guide slots 73 and 76, the upper and lower edges of the film riding in these guide slots. The beveled edges 72 and 75 guide these edges into the respective slots when the film is tensioned, e.g., when the reeling process is begun.

The film guide member 77 is mounted on the block 47 by ears 79 integral therewith at the open ends of the U. The ears 79 are attached by screws 80 to the edges of the block 47 at the cut away portion 68.

FILM ADVANCE AND REWIND MECHANISM

For purposes of description of this invention, the spindle 24 will be designated as the spindle for the film strip feed and the spindle 27 will be designated as the spindle for the film strip winding or take-up. The advance of the film from the spindle 24 to the spindle 27 will be designated as the advance direction while the movement of the film from spindle 27 to spindle 24 will be designated as rewind.

The motor 86 is mounted on the underside of plate 25 by a mounting unit. 87. The motor 86 has a drive pulley 88 which drives a belt or band B. The band B travels around the pulley 88, over idler pulley 89 and over idler pulley 90. The idler pulley 90 maintains the proper belt or band tension by virtue of its pivotal mounting of the arm 91 on a pivot pin or axle 92. The arm 91 is connected to a coil spring 93 which urges the arm 91 and its pulley 90 to pivot in a clockwise direction as viewed in FIGURE 2. This keeps the proper amount of tension in the belt or band B.

The belt or band B also travels around pulleys 94 and 95 in opposite directions. These pulleys are connected via a friction clutch mechanism to the spindles 24 and 27. The belt or band B is wound about the pulleys 94 and 95 in a manner whereby the pulleys 94 and 95 are driven in opposite directions of rotation.

Figure 1:
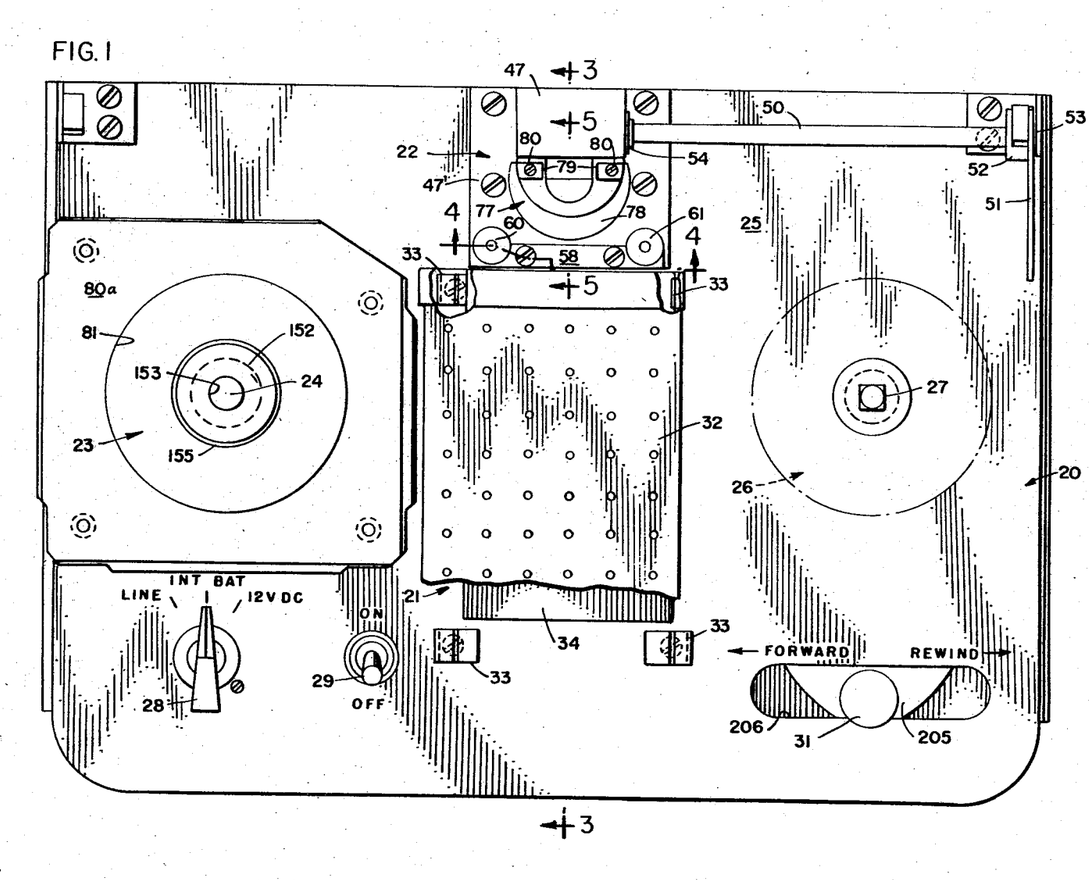
FIG. 1 is a top plan view of the preferred flexible strip advancing and rewinding apparatus.

A film magazine-mounting clip 80a with center hole 81 may be mounted on plate 25, as shown in FIG. 1.

Figure 6:
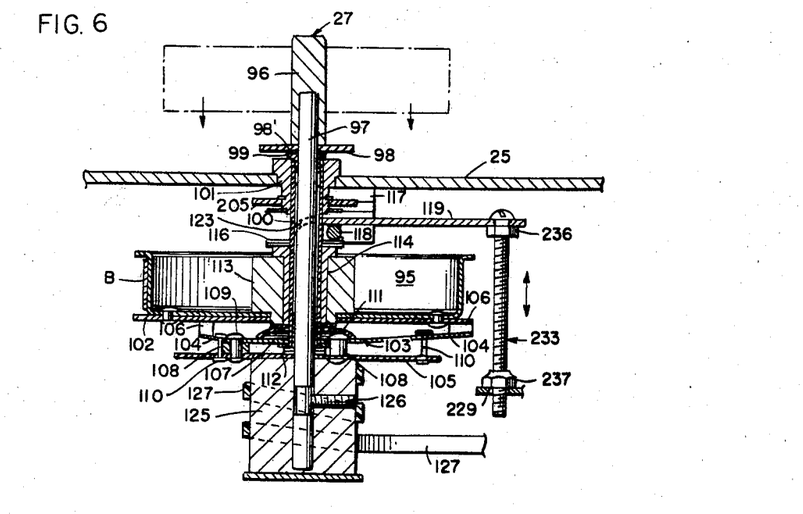
FIG. 6 is a section view taken on section plane 6—6 of FIG. 2.

Referring now to FIGURE 6, the spindle 27 comprises a spindle head 96 of square cross section coupled to the spindle shaft 97. A loose washer 98 is seated around the spindle shaft 97 beneath the spindle head 96. The washer 98 rests on a washer 98', which in turn rests on fixed bearing 99. Bearing 99 is mounted in a fixed tube 100, the latter surrounding the rotatable spindle shaft 97. The bearing 99 and the tube 10 are fixedly secured in a mounting hub 101, which in turn is rigidly supported in the plate 25. The underside of the pulley 95 is attached by rivets or other suitable means to a clutch plate 102. The engaging element 103 of the clutch is the driven element. It comprises three, radially extending springable arms 104, each of which have at their outer ends friction pads 106. Such pads 106 may be made, for example, of cork material. The hub or center portion 107 of the clutch element 103 is coupled by spacers 108 and rivets 109 to a disc 105 of the brake element, later described.

The pulley 95 has its sleeve bearing 114 of hub 113 rotatably journalled on the fixed tube 100. The pulley rests on a stack of washers including an arched, resilient, spring washer 111. These washers are held on the lower end of the fixed tube 100 by a grip ring 112 attached to the lower end of the tube. The structure shown in the detail of FIG. 7A for spindle 24 is also used in like combination and manner on the spindle 27.

Figure 2:
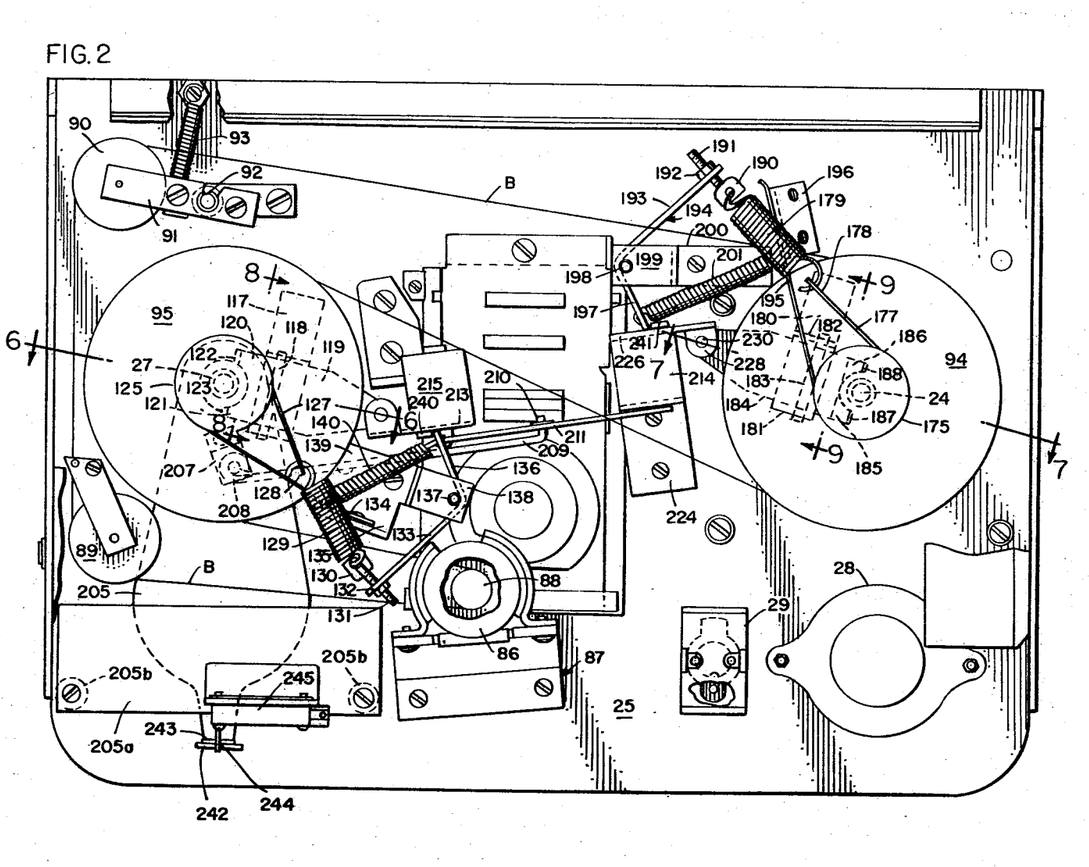
FIG. 2 is a bottom plan view thereof.

The mechanism for urging the pulley 95 and its clutch element 102, i.e., the clutch plate 102, downwardly into driving engagement with the pads 106 of the clutch element 103 comprises a bracket 117 supported on the underside of plate 25. This bracket element has two downwardly depending legs between which is rotatably supported a horizontal pin 118. The pin 118 is attached by welding or other suitable means to a pivot arm 119, as shown in FIGS. 2 and 6. The pivot arm 119 has forks 120 and 121 at its end. The forked ends 120 and 121 have downwardly curved end portions 122 and 123 which, upon downward pivoting of said ends about the pivot of pin 118, pushes downwardly on washers 116 and urges the pulley 95 and its driven element 102 of the clutch into frictional engagement with the pads 106 of the clutch element 103. When the downward pressure by the forked ends 122 and 123 is released, the springable washer 111 raises the pulley 95 and its clutch element 102 upwardly out of driving contact with the pads 106.

The arms 104 are laterally stabilized by pins 110 fixed at their bases to disc 105 of the brake element. These pins 110 extend through holes in the respective arms 104 in a slide fit to permit the arms 104 to have some vertical springing movement when the clutch plate 102 presses against pads 106.

The brake for the spindle 27 comprises a brake drum cylinder 125 coupled by a set screw 126 to the lower end of the shaft 97 of spindle 27. The brake drum 125 has spirally wound thereabout a flexible brake band 127. This brake band is made of any suitable, flexible band material, such as Teflon, cotton, Teflon impregnated with fine, solid particles to increase the wear resistance of the Teflon, and the like. One end 128 of the brake band 127 is connected to a coil spring 129. The opposite end of the coil spring is connected to a head 130 on a threaded shank 131. The threaded shank 131 has a nut 132 holding the shank 131 in one end of a leg 133 of a pivot bar. The other end 134 of the flexible band 127 is fixedly attached by a rivet or the like to a bracket 135 mounted on and depending from the base plate 25. Thus, the end 134 of the band 127 is rigidly mounted whereas the end 128 is yieldably mounted through the coil spring 129. When the tension in the brake band 127 is working against the fixed end 134, the brake has a harder braking action than is the case when the tension is working against the yieldable end 128 inasmuch as the coil spring releases the tension to some degree as the brake band is pulled in tension against the coil spring 129. This is important in achieving the desired braking action when the spindles are brought to a stop, as will be later described.

The pivot bar comprising the arms 133 and 136 has at the juncture of said arms a pivot pin 137 rigidly secured to the pivot bar. The pivot pin 137 is rotatably mounted in horizontal legs 138 of a bracket 139, the base of which is mounted in superposed relationship over the base of the bracket 135.

The arm 136 of the pivot bar is connected at one end to a coil spring 140, the other end of which is attached to the bracket 135. The spring 140 thus urges the pivot bar composed of arms 133 and 136 in a counterclockwise direction as viewed in FIG. 2.

The spindle 24 (FIG. 7) is similar in most respects to spindle 27. It comprises a spindle head having a shank 150 of square cross section with a flange 151. It has a round, lower shank 154 seated in a ring, wafer magnet 152 with a central hole 153. The magnet 152 holds the spindle head 150 and its flange 151 so that they rotate with the magnet 152. This spindle head is, however, removable by pulling the spindle head out of the magnet 152.

Figures 7, 7A:
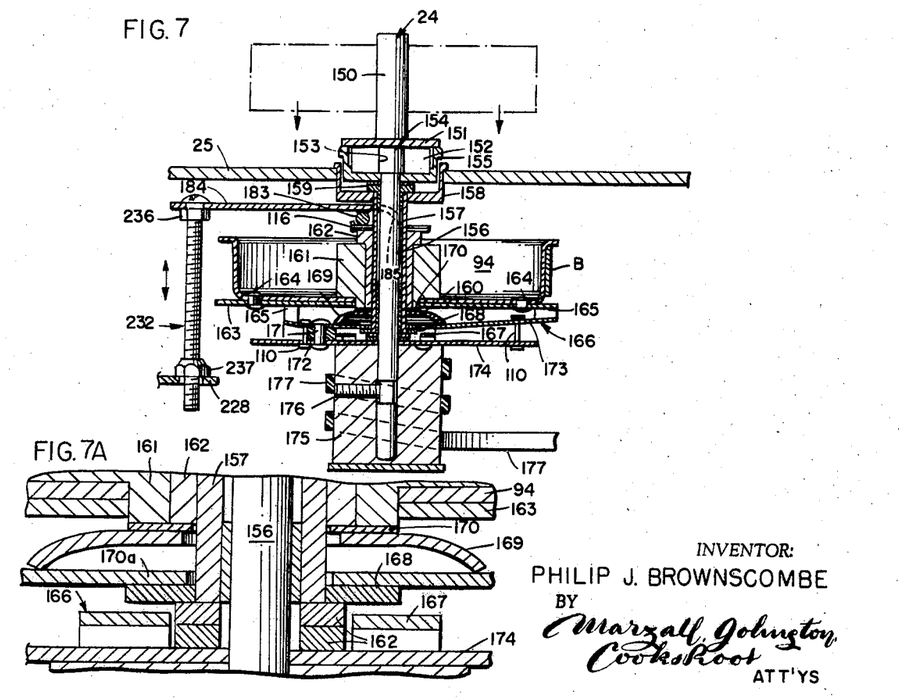
FIG. 7 is a section view taken on section plane 7—7 of FIG. 2
FIG. 7A is an enlarged detail of a segment thereof.

Magnet 152 is mounted in a hub 155, which is attached to and rotatable with the shank 156 of the spindle 24. The shank 156 rotates inside fixed tube 157 in the bearings 159 and 160. The bearing 159 is mounted in a mounting hub 158 which is rigidly mounted in the plate 25.

The pulley 94 has a hub 161 having a sleeve bearing 162 which is rotatable relative to fixed tube 157. The pulley 94 has attached thereto by rivets 164 the driving element of the clutch, i.e., the clutch plate 163. The clutch plate 163 is adapted to move into and out of driving relationship with the cork pads 165 of the driven element 166 of the clutch. The driven element 166 comprises a hub or central portion 167 with three radial arms 173, on the outer ends of which are affixed the cork pads 165, which are similar in nature to the pads 106 in the clutch mechanism illustrated in FIG. 6. The hub or central portion 167 of the clutch element 166 is coupled by spacers 172 and rivets 171 to a disc 174 of the brake drum 175.

Referring to FIG. 7A, the fixed tube 157 rotatably journals the sleeve bearing 162 of the hub 161 of the pulley 94. The pulley rests on a washer 170, an arched resilient spring washer 169, and a larger washer 170a held on the lower end of the fixed tube by a grip ring 168 attached to the lower end of the tube. Spacing washers 162 separate the lower end of the fixed tube from the upper end of the brake drum.

The mechanism for urging the pulley 94 and its clutch element 163, i.e. the clutch plate 163, downwardly into driving engagement with the pads 165 of the clutch element 163 comprises a bracket 180 supported on the underside of plate 25. This bracket has two downwardly depending legs 181 and 182 between which is rotatably supported a horizontal pin 183. The pin 183 is attached by welding or other suitable means to a pivot arm 184, as shown in FIGS. 2 and 7. The pivot arm 184 has forks 185 and 186 at its end. The forked ends 185 and 186 have downwardly curved end portions 187 and 188 which, upon downward pivoting of said ends about the pivot of pin 183, pushes downwardly on washers 116 and urges the pulley 94 and its clutch plate 163 into frictional engagement with the pads 165 of the clutch element 166. When the downward pressure by the forked ends 185 and 186 is released, the springable disc element 168 causes the pulley 94 and its clutch element 163 upwardly out of driving contact with the pads 165. Disc 174 and arms 173 have interconnecting pins 110 of the same character as previously described.

The brake for the spindle 24 comprises a brake drum cylinder 175 coupled by a set screw 176 to the lower end of the shaft 156 of spindle 24. The brake drum 175 has spirally wound thereabout a flexible brake band 177. This brake band is made of any suitable, flexible band material, such as Teflon, cotton, Teflon impregnated with fine, solid particles to increase the wear resistance of the Teflon, and the like. One end 178 of the brake band 177 is connected to a coil spring 179. The opposite end of the coil spring is connected to a head 190 on a threaded shank 191. The threaded shank 191 has a nut 192 holding the shank 191 in one end of a leg 193 of a pivot bar 194. The other end 195 of the flexible band 177 is fixedly attached by a rivet or the like to a bracket 196 mounted on and depending from the base plate 25. Thus, the end 195 of the band 127 is rigidly mounted whereas the end 178 is yieldably mounted through the coil spring 179. When the tension in the brake band 127 is working against the fixed end 195, the brake has a harder braking action than is the case when the tension is working against the yieldable end 178 inasmuch as the coil spring releases the tension to some degree as the brake band is pulled in tension against the coil spring 179.

The pivot bar 194 comprising the arms 193 and 197 has at the juncture of said arms a pivot pin 198 rigidly secured to the pivot bar. The pivot pin 198 is rotatably mounted in horizontal legs 199 of a bracket 200, the base of which is mounted on the bottom of plate 25.

The arm 197 of the pivot bar 194 is connected at one end to a coil spring 201, the other end of which is attached to the bracket 196. The spring 201 thus urges the pivot bar 194 in a counterclockwise direction as viewed in FIG. 2.

Figures 8, 9, 10:
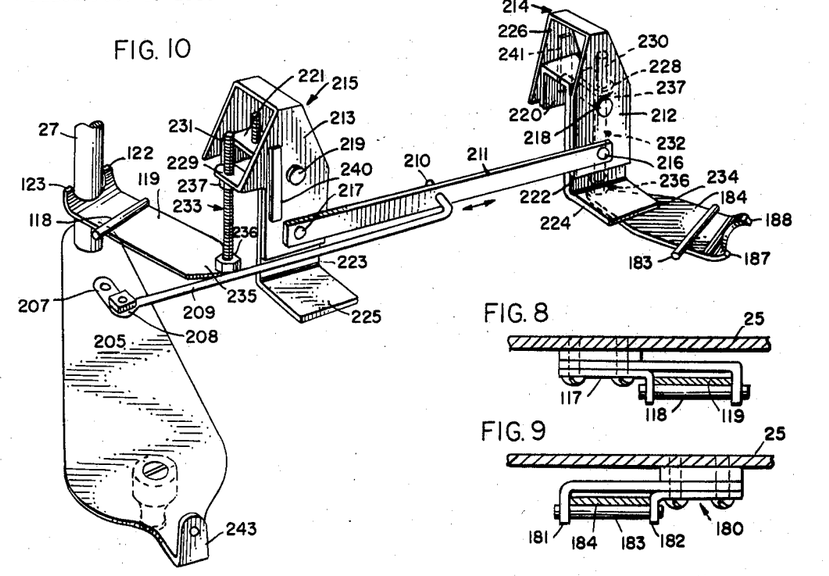
FIGS. 8 and 9 are section views taken on section planes 8—8 and 9—9 of FIG. 2, respectively.
FIG. 10 is a perspective view of the mechanical linkage for activating and de-activating the rotary drive of the spindles as said linkage is viewed in FIG. 2.

Referring particularly to FIGS. 2 and 10, the hub 101 of spindle 27 pivotally supports an apertured end of a pivotable actuator plate 205, which slides between the plate 25 and the guide plate 205a held in spaced relation by the screws and ring spacers 205b. The opposite end of actuator plate 205 is connected to handle 31, which extends through the slot 206 in plate 25 (FIG. 1). The lower side of plate 205 has a bracket 207 to which is pivotally connected the eye 208 of a push-pull rod 209. The bent end 210 of rod 209 is coupled to bar 211, the respective ends of which are pivotally linked by pins 216 and 217 to the respective legs 212 and 213 of pivotable, U-arms 214 and 215.

The U-arms 214 and 215 are pivoted by pins 218 and 219 on the U-segments 220 and 221 of mounting brackets 222 and 223, the bases 224 and 225 of which are attached to the underside of plate 25. Thus, horizontal movement of rod 209 and bar 211 by actuator plate 205 is translated into pivotal movement of U-arms 214 and 215.

The ends of legs 226 and 213 of U-arms 214 and 215 each have an apertured ear 228 and 229, through the respective apertures of which extends in loose relationship the threaded shanks 230 and 231 of bolts 232 and 233. The head ends of the bolts extend loosely through apertures in the tapered portions 234 and 235 of pivot arms 119 and 184, respectively. Bolts 232 and 233 are connected to pivot arms 119 and 184 by nuts 236. Nuts 237 provide an axially shiftable abutment on threaded shanks 230 and 231, against which the respective ear 228 or 229 acts when the latter is swung upwardly toward plate 25. When the respective ear swings downwardly away from plate 25, the ear slides relative to bolt shank 230 or 231 by virtue of the aforesaid loose fit.

Thus, when handle 31 (as viewed in FIG. 1) is pushed to the left (forward position), the rod 209 and bar 211 move in the same, actual, general direction (but to the right as viewed in FIGS. 2 and 10). The pivotable U-arms 214 and 215 pivot counterclockwise as viewed in FIG. 10, causing ear 229 to swing against its nut 237 which ear 228 swings away from its nut 237. Pivot arm 119 is pivoted, whereby its forked ends 122 and 123 cause clutch plate 102 of pulley 95 to engage cork pads 106 thus applying torque to spindle 27. The drive of spindle 24 is not engaged in this position.

The band brakes on the spindles are released by movement of the pivot arm 205 as follows. Referring to FIG. 2, the leg 213 of pivotable U-arm 215 has a vertical bar 240 welded thereon. The outer edge of leg 136 lies against bar 240 when pivot plate 205 is in center position. As pivotable U-arm 215 pivots in either direction, bar 240 tilts about the axis of pin 219 and rotates the pivot bar comprising pivot arms 133 and 136 in a clockwise direction as viewed in FIG. 2. This releases the tension in brake band 127.

Leg 226 of pivotable U-arm 214 has a similar, vertical bar 241 against which rests the outer edge of arm 197 of pivot bar 194. As U-arm 214 pivots in either direction, bar 241 tilts about the axis of pin 218 and rotates the pivot bar 194 in a clockwise direction as viewed in FIG. 2 to similarly release tension in brake band 177.

Thus movement of the pivotable actuator plate 205 in either direction from center or home position releases the tension in both brake bands either slowly or quickly, depending on the speed and amount of pivotal movement of plate 205. When the latter is moved to its extreme left or right position, tension in the brake bands 127 and 177 preferably is completely released so that there is no brake drag.

For rewind, plate 205 is moved to the right as viewed in FIG. 1. This moves rod 209 and bar 211 in the same general direction (to the left as viewed in the flopped bottom views of FIGS. 2 and 10). The clutch for spindle 24 is thereby engaged in a manner similar to that previously described for the spindle 27 when plate 205 is moved in the opposite direction.

The outer edges of arms 136 and 197 are coextensive (or longer) with the bars 240 and 241. Under urging of springs 201 and 140, the mechanical linkage returns to home or rest position with these edges lying against and parallel with the contiguous sides of the respective bars 240 and 241. The mechanism, therefore, returns to rest or home position under urging of springs 201 and 140 with the actuator plate 205 in center position (as shown in FIGS. 1 and 2).

In home or center position, the wheel or disc 242 on the downwardly depending tab 243 at the outer end of plate 205 trips the spring-loaded arm 244 of microswitch 245 to open the microswitch and deenergize the electrical circuit for motor 86. When plate 205 is swung left or right, the spring-loaded arm 244 is released, and the microswitch closes. The motor 86 then is energized.

Accordingly, movement of actuator plate 205 left or right from home or center position simultaneously causes torque to be applied to one of the spindles 24 or 27, releases the band brakes of both spindles and starts the motor 86 to run.

When the plate 202 returns to home position, the respective spindle clutch is disengaged, the band brakes are applied to both spindles and the motor 86 is deenergized. The band brakes are arranged in a manner whereby the trailing spindle (the spindle from which the film is being unwound) has applied a greater braking force than is applied to the lead spindle. For example, when film is being advanced at full speed from a spool or magazine on spindle 24 onto a spool or spindle 27, the spindle 24 is rotating freely and counterclockwise and the spindle 27 is driven counterclockwise (as viewed in FIG. 2). If handle 31 is suddenly released, bands 127 and 177 are tensioned. The counterclockwise rotation of brake drum 175 is resisted by tension in brake band 177 against fixed end 195, thereby applying full braking force to trailing spindle 24. On the other hand, the counterclockwise rotating brake drum 125 of leading spindle 27 causes the tension in brake band 127 to work against the end connected to spring 129, whereby the braking torque on spindle 27 is considerably less than the braking torque on spindle 24. This keeps the film strip in tension during braking and avoids film spillage by overrun of the spool or magazine on the trailing spindle 24.

Similarly, when film is being rewound from the spool on spindle 27 to the spool or magazine on spindle 24, the same type of braking action occurs. In this case, the tension in brake band 127 of spindle 27 works against fixed end 134 while the tension in the brake band 177 of spindle 24 works against the end 178 coupled to spring 179.

Figure 11:
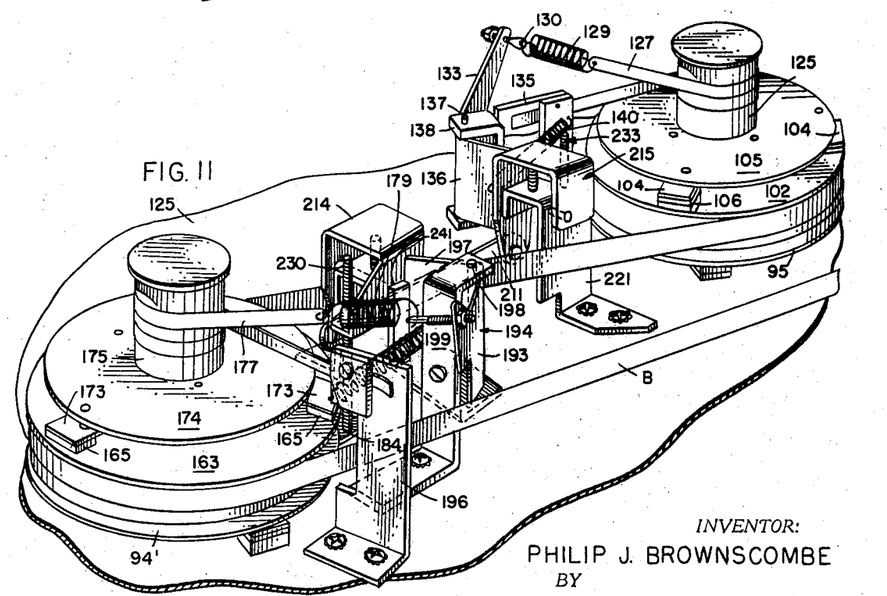
FIG. 11 is a perspective view of the mechanical linkage for operating the brakes on the spindles as said linkage is viewed in FIG. 2.

Thus, the invention provides film strip reeling apparatus comprising a first rotatable spindle 24, a second rotatable spindle 27, a respective brake drum 175 and 125 coupled to each spindle, a respective flexible brake band 177 and 127 spirally wound about each spindle, brake activating means illustrated in FIG. 11 for substantially simultaneously applying and releasing tension in each brake band to substantially simultaneously apply and to substantially simultaneously release, respectively, the braking effect of the respective brake bands 177 and 127 on the respective brake drums 175 and 125, and drive means for applying selectively a rotary drive torque to one or the other of said spindles as said tension in each brake band is released and for disengaging the drive torque as said tension is applied. More particularly, said drive means embodies a friction clutch in the rotary drive of each spindle, each clutch having normally-disengaged rotatable driving members 163 and 102 and driven members 166 and 103, and means illustrated in FIG. 10 for selectively engaging the driving and driven members of one of said clutches as said brake-activating means illustrated in FIG. 11 releases tension in said brake bands 177 and 127.

Still more particularly, said brake activating means and said drive means each respectively embody mechanical linkage means activated simultaneously through additional, common mechanical linkage means as illustrated in FIGS. 10 and 11, and said additional, common mechanical linkage means include a first pivotable member 214 adjacent said first spindle 24, a second pivotable member 215 adjacent said second spindle 27, a link arm 211 connecting said pivotable members, means 179, 194 and 190–192 and 129–132 and 133, 136 operatively connecting said brake bands with a respective pivotable member 214 and 215 for releasing said tension in each brake band 177 and 127 upon pivoting of said pivotable members simultaneously by movement of said link arm 211, and means illustrated in FIG. 10 operatively connecting the respective pivotable members 214 and 215 to a respective clutch for selective engagement of the driving and driven elements of one clutch when said pivotable members are pivoted in one direction and for selective engagement of the driving and driven elements of the other clutch when said pivotable members are pivoted in the other direction.

The driving element of each clutch comprises a rotatably-driven clutch plate 163 and 102, and said driven element of each clutch comprises a hub portion 167 and 107 coupled to the respective spindle 24 and 27 (via brake drums 175 and 125) and a plurality of springable, radial arms 173 and 104 on each hub portion, friction-inducing pads 165 and 106 on said arms, and means 169 and 111 resiliently and yieldably holding said respective clutch plates in normally spaced, non-driving relation to said pads. The embodiment further provides a fixed tube 157 and 100 rotatably journalling each spindle 24 and 27 therein, a pulley 94 and 95 rotatably journalled on each fixed tube, band drive means B for rotatably driving said pulleys in opposite directions of rotation, and means 164 attaching said clutch plates to a respective pulley.

The aforesaid mechanical linkage means is operatively connected to a manually movable actuator arm 205 and to said brake activating means and to said drive means as shown in FIGS. 10 and 11 to apply selectively said rotary drive torque to one or the other of said spindles 24 or 27 as said tension in each brake band 177 and 127 is released and for disengaging the drive torque as said tension is applied. As shown in FIGS. 2 and 11, one end 195 and 134 of each of the respective brake bands 177 and 127 is securely attached to a respective rigid frame member 196 and 135 and the other end of each of said brake bands is attached via a coil spring 179 and 129 to the pivotable members 194 and 133, 136 of the brake activating means.

Figure 4:
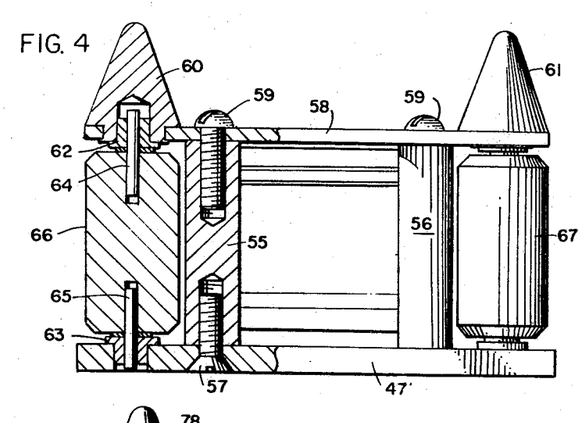
FIG. 4 is a section view taken on section plane 4—4 of FIG. 1.
Figure 5:
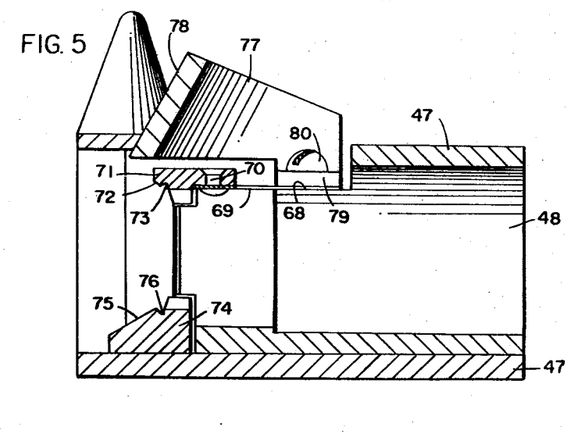
FIG. 5 is a section view taken on section plane 5—5 of FIG. 1.

The combination for reeling a film strip and projecting elected frames thereof comprises a frame 25, a light projection unit 21 mounted on said frame, said unit including a lamp 36, mirror 43 and members 44–46 for projecting a beam of light, a focusing unit on said frame and including an axially movable focusing lens 49 positioned in the path of said light beam, a film strip guide member (FIGS. 4 and 5) mounted on said frame between said light projection unit 21 and said focusing unit, means 73 and 76 on said member for slidably guiding said film strip transversely across said beam of light, a first spindle 24 rotatably mounted on said frame to one side of said light projection unit 21, a second spindle 27 rotatably mounted on said frame to the other side of said light projection unit, power means as aforedescribed for selectively and individually rotating said spindles for advance or rewind of film on reels on said spindles, said power means including a slip clutch as aforedescribed, brake means 177, 175 and 127, 125 operatively coupled to each respective spindle 24 and 27, and manually operated means illustrated in FIGS. 10 and 11 adapted to gradually release said brake means while gradually engaging said slip clutch means on a respective spindle to apply gradually drive torque to said spindle and thereby rotatably drive said spindle when its applied torque overcomes the braking action of said brake means.

The film strip guide member comprises upper and lower, oppositely disposed, vertically spaced film strip guide members 71 and 74 respectively above and below said beam of light, said upper guide member having a downwardly facing guide groove 73 extending transversely of the direction of said beam of light, said lower guide member having an upwardly facing groove 76 opposite of and parallel with said first-mentioned groove, said grooves respectively adapted to receive and slidably guide the upper and lower edges of said film strip as the latter is drawn across said beam of light by rotating respective reels (not shown) of film strip on the spindles 24 and 27, and a pair of vertically disposed rollers 66 and 67 at respective opposite sides of said film guide members for guiding said film strip into said grooves as said film strip is wound onto one of said reels and off of the other of said reels. The guide members 71 and 74 preferably have sloping, rearwardly diverging faces 72 and 75 just behind the grooves 73 and 76 for guiding the respective edges of the film strip into the respective grooves when said film strip is drawn in light tension across said film guide member.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A film strip reeling apparatus comprising a first rotatable spindle, a second rotatable spindle, a respective brake drum coupled to each spindle, a respective, flexible brake band spirally wound in opposite directions about each spindle, brake activating means for selectively gradually or rapidly, substantially simultaneously applying and releasing tension in each brake band to substantially simultaneously apply and to substantially simultaneously release, respectively, the braking effect of the respective brake bands on the respective brake drums, and drive means for applying selectively a rotary drive torque to one or the other of said spindles as said tension in each brake band is released and for disengaging the drive torque as said tension is applied.

2. An apparatus as claimed in claim 1, wherein said drive means embodies a friction clutch in the rotary drive of each spindle, each clutch having normally-disengaged rotatable driving and driven members, and means for selectively engaging the driving and driven members of one of said clutches as said brake-activating means releases tension in said brake bands.

3. An apparatus as claimed in claim 1 wherein said brake activating means and said drive means each respectively embody mechanical linkage means activated simultaneously through additional, common mechanical linkage means.

4. An apparatus as claimed in claim 3 wherein said additional, common mechanical linkage means include a first pivotable member adjacent said first spindle, a second pivotable member adjacent said second spindle, a link arm connecting said pivotable members, means operatively connecting said brake band with a respective pivotable member for releasing said tension in each brake band upon pivoting of said pivotable members simultaneously by movement of said link arm, and means operatively connecting the respective pivotable members to a respective clutch for selective engagement of the driving and driven elements of one clutch when said pivotable members are pivoted in one direction and for selective engagement of the driving and driven elements of the other clutch when said pivotable members are pivoted in the other direction.

5. An apparatus as claimed in claim 4, said driving element of each clutch comprising a rotatably-driven clutch plate, said driven element of each clutch comprising a hub portion coupled to the respective spindle and a plurality of springable, radial arms on each hub portion, friction-inducing pads on said arms, and means resiliently and yieldably holding said respective clutch plates in normally spaced, nondriving relation to said pads.

6. An apparatus as claimed in claim 5, a fixed tube rotatably journalling each spindle therein, a pulley rotatably journalled on each fixed tube, band drive means for rotatably driving said pulleys in opposite directions of rotation, and means attaching said clutch plates to a respective pulley.

7. An apparatus as claimed in claim 1, and mechanical linkage means operatively connected to a manually movable actuator arm and to said brake activating means and to said drive means to apply selectively said rotary drive torque to one or the other of said spindles as said tension in each brake band is released and for disengaging the drive torque as said tension is applied.

8. An apparatus as claimed in claim 1, one end of each of the respective brake bands being securely attached to a rigid frame member and the other end of each of said brake bands being attached via a spring to said brake activating means.

9. An apparatus for reeling a film strip and projecting selected frames thereof comprising a frame, a light projection unit mounted on said frame, said unit including a lamp, mirror and lenses for projecting a beam of light, a focusing unit on said frame and including an axially movable focusing lens positioned in the path of said light beam, a film strip guide member mounted on said frame between said light projection unit and said focusing unit, means on said member for slidably guiding said film strip transversely across said beam of light, a first spindle rotatably mounted on said frame to one side of said light projection unit, a second spindle rotatably mounted on said frame to the other side of said light projection unit, power means for selectively and individually rotating said spindles for advance or rewind of film on reels on said spindles, said power means including a slip clutch, brake means operatively coupled to each respective spindle, and manually operated means adapted to gradually release said brake means on one spindle while gradually engaging said slip clutch means on the other spindle and also releasing said brake means on said other spindle to apply gradually drive torque to said other spindle and thereby rotatably drive said other spindle when its applied torque overcomes the braking action of said brake means.

10. An apparatus as claimed in claim 9, said film strip guide member comprising upper and lower, oppositely disposed, vertically spaced film strip guide members respectively above and below said beam of light, said upper guide member having a downwardly facing guide groove extending transversely of the direction of said beam of light, said lower guide member having an upwardly facing groove opposite of and parallel with said first-mentioned groove, said grooves respectively adapted to receive and slidably guide the upper and lower edges of said film strip as the latter is drawn across said beam of light by rotating respective reels of film strip on said spindles, and a pair of vertically disposed rollers at respective opposite sides of said film guide members for guiding said film strip into said grooves as said film strip is wound onto one of said reels and off of the other of said reels.

11. An apparatus as claimed in claim 10, and sloping, rearwardly diverging faces on said guide members just behind said grooves for guiding the respective edges of the film strip into the respective grooves when said film strip is drawn in light tension across said film guide member.

12. An apparatus as claimed in claim 9 wherein said manually operated means embodies mechanical linkage means for simultaneously releasing gradually said brake means and engaging gradually said slip clutch means on a respective spindle by manual manipulation of said mechanical linkage means.

13. An apparatus as claimed in claim 9, said brake means comprising a respective brake drum coupled to each spindle, a respective, flexible brake band spirally wound about each drum in opposite directions, brake activating means for substantially simultaneously applying and releasing tension in each brake band to substantially simultaneosuly apply and to substantially simutaneously release, respectively, the braking effect of the respective brake bands on the respective brake drums.

14. An apparatus as claimed in claim 13, said mechanical linkage means including a first pivotable member adjacent said first spindle, a second pivotable member adjacent said second spindle, a link arm connecting said pivotable members, means operatively connecting said brake band with a respective pivotable member for releasing said tension in each brake band upon pivoting of said pivotable members simultaneously by movement of said link arm, means operatively connecting the respective pivotable members to a respective clutch for selective engagement of the driving and driven elements of one clutch when said pivotable members are pivoted in one direction and for selective engagement of the driving and driven elements of the other clutch when said pivotable members are pivoted in the other direction.

15. An apparatus as claimed in claim 14, said driving element of each clutch comprising a rotatably-driven clutch plate, said driven element of each clutch comprising a hub portion coupled to the respective spindle and a plurality of springable, radial arms on each hub portion, friction-inducing pads on said arms, and means resiliently and yieldably holding said respective clutch plates in normally spaced, non-driving relation to said pads.

16. An apparatus as claimed in claim 15, a fixed tube rotatably journalling each spindle therein, a pulley rotatably journalled on each fixed tube, band drive means for rotatably driving said pulleys in opposite directions of rotation, and means attaching said clutch plates to a respective pulley.

17. An apparatus as claimed in claim 13, one end of each of the respective brake bands being securely attached to a rigid frame member and the other end of each of said brake bands being attached via a spring to said brake activating means.

References Cited

UNITED STATES PATENTS

| | | | |
|---|---|---|---|
| 2,407,009 | 9/1946 | Holbrook. | |
| 2,881,659 | 4/1959 | Eagle. | |
| 2,937,569 | 5/1960 | Wilton. | |
| 3,000,583 | 9/1961 | Hoskin | 242—55.12 |
| 3,092,344 | 6/1963 | Dinsmore et al. | 242—55.12 |
| 3,092,345 | 6/1963 | Clayton et al. | 242—55.12 |
| 3,109,603 | 11/1963 | Berlant | 242—55.12 |

NORTON ANSHER, Primary Examiner

RICHARD M. SHEER, Assistant Examiner

U.S. Cl. X.R.

242—51.12